United States Patent
Wynne

(10) Patent No.: US 6,863,582 B1
(45) Date of Patent: Mar. 8, 2005

(54) AIR VENTILATION SYSTEM FOR A WATERCRAFT

(75) Inventor: Dallas Wynne, Spirit Lake, IA (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/620,030

(22) Filed: Jul. 15, 2003

(51) Int. Cl.[7] .................................................. B63H 21/00
(52) U.S. Cl. ..................................... 440/88 A; 114/211
(58) Field of Search .......................... 440/88 A, 88 R, 440/89 R; 114/211, 363

(56) References Cited

U.S. PATENT DOCUMENTS

| | | | | |
|---|---|---|---|---|
| 4,568,293 A | | 2/1986 | Yazaki | 440/88 R |
| 4,982,682 A | | 1/1991 | Hattori | 114/55.51 |
| 5,664,515 A | * | 9/1997 | Hattori et al. | 114/211 |
| 5,735,229 A | | 4/1998 | House et al. | 114/363 |
| 5,752,867 A | | 5/1998 | Koyanagi | 440/89 R |
| 5,918,564 A | | 7/1999 | Ohtsuka et al. | 114/363 |
| 6,022,253 A | * | 2/2000 | Ozawa et al. | 440/89 R |
| 6,089,932 A | * | 7/2000 | Nanami et al. | 440/88 R |
| 6,139,381 A | * | 10/2000 | Suzuki et al. | 440/88 A |
| 6,322,409 B1 | * | 11/2001 | Hattori et al. | 440/88 R |
| 6,375,527 B2 | | 4/2002 | Gohara | 440/89 R |
| 6,419,533 B2 | * | 7/2002 | Lecours | 440/89 R |
| 6,435,924 B2 | * | 8/2002 | Ishino | 440/88 R |
| 6,471,557 B1 | | 10/2002 | Hattori | 440/88 R |
| 6,471,558 B1 | | 10/2002 | Nakatsuji et al. | 440/88 R |
| 6,578,508 B2 | | 6/2003 | Hattori et al. | 114/55.57 |

\* cited by examiner

Primary Examiner—Lars A. Olson
(74) Attorney, Agent, or Firm—Natalie D. Kadievitch; Fredrikson & Byron, P.A.

(57) ABSTRACT

An air ventilation system for a personal watercraft that includes a pair of pipes extending substantially side by side through the watercraft's hull from a first side to a second side where the pipes have an intake port located through the deck above the waterline of the watercraft and an outlet port that extends into the bottom third of the hull below the waterline.

23 Claims, 5 Drawing Sheets

AIR VENTILATION SYSTEM FOR A WATERCRAFT

FIELD OF THE INVENTION

This invention relates to small watercraft such as a personal watercraft and, more particularly, to an improved ventilation system therefore.

BACKGROUND OF THE INVENTION

Personal watercrafts are a popular type of watercraft in which one or more passengers ride on, rather than in, the watercraft.

Frequently, these watercrafts are sporting in nature, and the riders expect to leave the watercraft at times during its use and enter into the body of water in which the watercraft is operating.

A relatively small hull of a personal watercraft defines a rider's area above an engine compartment. An internal combustion engine powers a jet propulsion unit, which propels the watercraft. The engine lies within the engine compartment in front of a tunnel formed on an underside of the hull. The jet propulsion unit, which includes an impeller, is placed within the tunnel. The impeller has an impeller shaft driven by the engine. The impeller shaft usually extends between the engine and the jet propulsion device through a bulkhead of the hull tunnel.

Personal watercraft with four-cycle engines are now being produced primarily for reducing exhaust emissions. The four-cycle engine desirably includes a plenum chamber that has a relatively large volume so as to obtain high performance under all running conditions. The four-cycle engine, however, has two or more valves and a valve drive mechanism, as well as the forgoing throttle bodies, which are factors that make the engine larger in height and/or width. On the other hand, because the rider's seat is defined above the engine compartment as noted above, the capacity and height of the engine compartment is limited. Otherwise, the seat position must be higher and/or wider which may not be comfortable for the rider.

In order for a personal watercraft to operate, the engine requires sufficient ventilation, i.e. circulation of air. Existing watercraft have employed various ventilation arrangements, however, none of these efficiently utilize the limited space within the hull or take account of the need for ease of assembly of the watercraft. In addition, intrusion of water into the hull in a roll-over condition is of concern.

Accordingly, it is important to make efficient use of the available space within the engine compartment defined by the hull of the watercraft so as to accommodate the necessary engine components within a hull sized to provide a comfortable seating position to the rider and any passengers. In addition, the overall center of gravity of the watercraft must be considered in the engine arrangement so as to not negatively affect the watercraft's handling. Furthermore, with limited access to the engine compartment, the engine and component arrangement preferably accommodates access to components of the engine which require routine maintenance. In addition, it is desirable to provide an air ventilation system that limits the intrusion of water into the hull of the craft in a roll-over condition.

In addition to supplying air to the engine for its combustion and discharge of the exhaust gases from the engine, it is further desirable to provide additional air ventilation for the engine compartment. That is, it is desirable to provide a continuous form of air circulation through the engine compartment in addition to the air that is consumed by the engine for its combustion. Such ventilation of the engine compartment assists in removing unwanted vapors from the engine compartment and also helps insure an adequate engine cooling and cooling of the other components in the engine compartment which do not have their own cooing systems.

SUMMARY OF THE INVENTION

According to a first aspect of the invention, there is provided a watercraft having an improved air ventilation system. The watercraft includes a hull, a deck, a propulsion device and an engine. The hull is divided in half lengthwise by a centerline to create a first side and a second side. The deck is located on the hull and is divided in half lengthwise by the centerline. The propulsion device is carried by the hull for propelling the watercraft and the engine is positioned within the hull to drive the propulsion device. The air ventilation system includes a first pipe and a second pipe. The first pipe has an intake port and an outlet port, the intake port of the first pipe located on the first side of the watercraft. The second pipe has an intake port and an outlet port, the intake port of the second pipe located adjacent to the intake port of the first pipe on the first side of the watercraft. The outlet port of the first pipe and the outlet port of the second pipe are located in a bottom region of the hull on the second side of the watercraft.

According to a second aspect of the invention, there is provided an air ventilation system for circulating air in a hull of a watercraft. The system includes a first pipe and a second pipe. The first pipe has an intake port and an outlet port, the intake port of the first pipe located on the first side of the watercraft. The second pipe has an intake port and an outlet port, the intake port of the second pipe located adjacent to the intake port of the first pipe on the first side of the watercraft. The outlet port of the first pipe and the outlet port of the second pipe are located in a bottom region of the hull on the second side of the watercraft.

According to a third aspect of the invention, there is provided a watercraft that includes a hull, a deck, a propulsion device and an engine. The hull is divided in half lengthwise by a centerline to create a first side and a second side. The deck is located on the hull and is divided in half lengthwise by the centerline. The propulsion device is carried by the hull for propelling the watercraft and the engine is positioned within the hull and drives the propulsion device. The air ventilation system includes means for circulating air in the hull of the watercraft.

According to a fourth aspect of the invention, there is provided a watercraft that includes a hull divided in half lengthwise by a centerline to create a first side and a second side, a deck located on the hull, the deck divided in half lengthwise by the centerline, a propulsion device carried by the hull for propelling the watercraft; an engine positioned within the hull, the engine driving the propulsion device, and an air ventilation system including a first pipe having an intake port and an outlet port, the intake port located on the first side of the watercraft and the second port located on the second side of the watercraft.

DETAILED DESCRIPTION OF THE PREFERRED EMBODIMENTS OF THE PRESENT INVENTION

Figure 1:
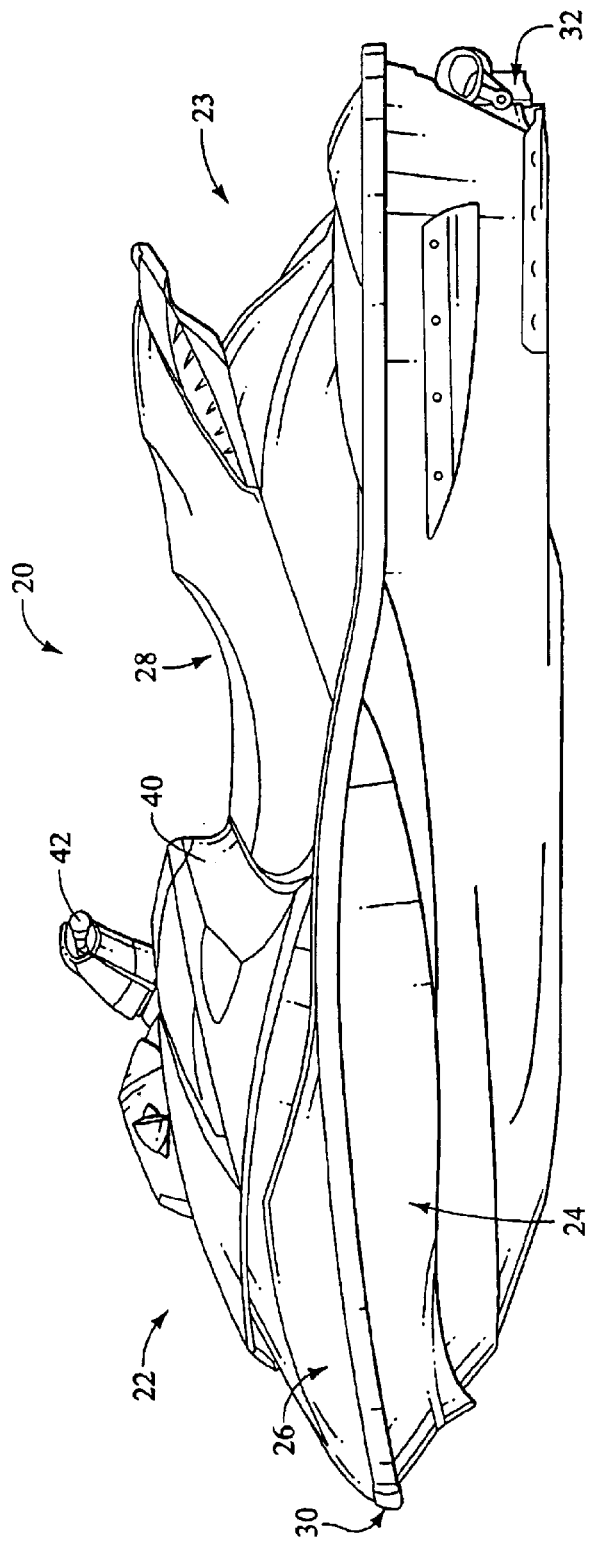
FIG. 1 is a perspective view of a personal watercraft according to a preferred embodiment of the present invention.

The following detailed description should be read with reference to the drawings, in which like elements in different drawings are numbered identically. The drawings depict selected embodiments and are not intended to limit the scope of the invention. It will be understood that embodiments shown in the drawings and described above are for illustrative purposes, and are not intended to limit the scope of the invention as defined in the claims that follow.

Figure 2:
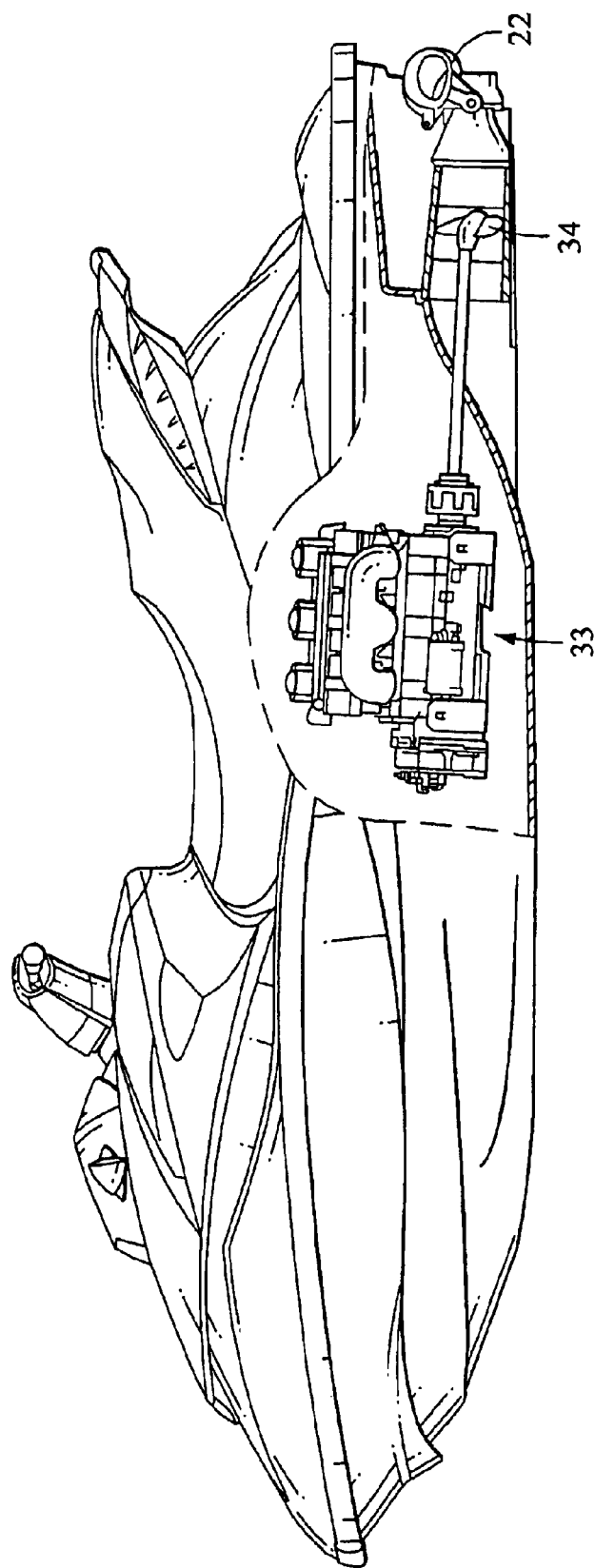
FIG. 2 is a cut-away view of the watercraft shown in FIG. 1.

FIG. 1 is a perspective view of a personal watercraft according to a preferred embodiment of the present invention. The personal watercraft 20 includes generally a front or bow 22 and a rear or stem 23. The personal watercraft 20 includes a top deck 26 secured to a bottom hull 24 along an overlapping portion covered with a rub rail 30 in the embodiment illustrated, thereby forming a hull. The hull includes an exhaust opening (not shown). The hull formed by the bottom hull 24 and top deck 26 define a compartment sized to contain an internal combustion engine 33 (See FIG. 2) for powering the watercraft, and may also include one or more storage compartments, depending upon the size and configuration of the watercraft. The deck portion 26 also has a raised, longitudinally extending seat 28 adapted to accommodate one or more riders seated in straddle fashion.

Engine 33 powers a jet propulsion unit 34, typically mounted in a tunnel at the bottom rear portion of the watercraft. Jet propulsion unit 34 includes a steerable water discharge nozzle 32 that is operatively connected to a set of handlebars 42 to facilitate steering of the watercraft by the operator. The handlebars 42 are mounted on a shroud 40 of the watercraft. The engine 33 may be of the two or four cycle variety. Of course, the engine 33 may have as few as one, or more than two cylinders, as appreciated by those skilled in the art. In engines of the four-stroke variety, the engine 33 includes a lubricating system (not shown). The lubricating system includes an oil reservoir (not shown) that must be drained and refilled routinely. The hull 24 may be made of any suitable material including molded fiberglass, reinforced resin plastic, and/or a sheet of molding compound.

As will be described in further detail hereinafter, a pair of intake ports 116, 122 are provided in the deck below the shroud 40 (See FIG. 5). The pair of intake ports 116, 122 form part of the ventilation system for the watercraft, namely they allow air to enter and exit the engine compartment.

Figure 3:
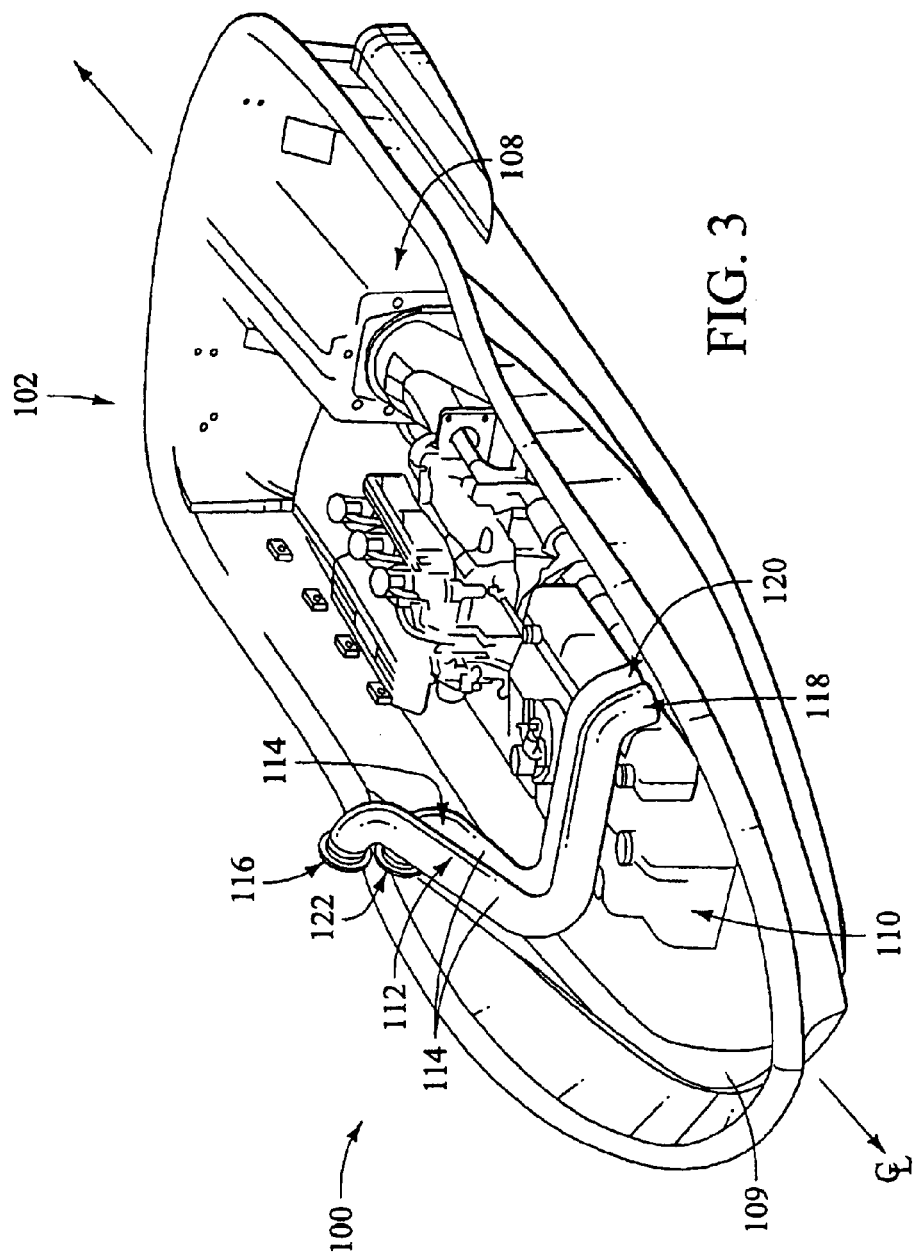
FIG. 3 is a perspective view of a ventilation system shown in the hull of a personal watercraft with the deck removed according to a preferred embodiment of the present invention.

FIG. 3 is a perspective view of a ventilation system 100 shown in the hull 102 of a personal watercraft with the deck removed according to a preferred embodiment of the present invention. The hull 102 is divided in half by a centerline 104 into a first side 106 and a second side 108. A fuel tank 110 is located in the hull 102 in a center region so that it straddles the centerline 104. The ventilation system located in the hull 102 includes two pipes, namely a first pipe 112 and a second pipe 114. The first pipe 112 has an intake port 116 and an outlet port 118. The second pipe 114 has an intake port 122 and an air outlet port 120. The outlet port 118 of the first pipe 112 and the outlet port 120 of the second pipe extend into a bottom region of the hull 102, below the waterline. More preferably, they extend into the lower third of the hull 102.

The pipes 112, 114 are secured to an intake manifold of the engine using straps (not illustrated). In a preferred embodiment, the pipes 112, 114 are made of polypropylene. The intake port 116 of the first pipe 112 and the intake port 122 of the second pipe 114 extend through the deck of the watercraft above the waterline (See FIG. 5). In a preferred embodiment these intake ports are located side-by-side below a portion of the shroud 40. The first and second pipes 112 and 114 generally extend side-by-side from the first side 106 of the watercraft over the fuel tank 110 and centerline 104 of the watercraft to the second side 108 of the watercraft.

The layout of the air ventilation system is desirable over previous arrangements in which the intake ports are located on both sides of the watercraft because if the watercraft is inverted in the water, the operator can roll the watercraft back over without acquiring a detrimental amount of water in the bottom of the hull. The layout of the ventilation system is also desirable from a manufacturing and serviceability perspective. Positioning the air intake port of the first pipe and the air intake port of the second pipe on the same side of the watercraft allows a single in-line assembly worker to attach the ports to the hull at a quicker pace and provides more space on the other side of the watercraft for a second assembly line worker to assemble other components of the watercraft. Also, because the first and second pipes 112, 114 are located substantially side-by-side throughout the hull, clutter within the watercraft is minimized which makes servicing the watercraft easier. Thus, the layout of the ventilation system allows the ventilation system to be packed in a tight space and thus occupy less space.

Figure 4:
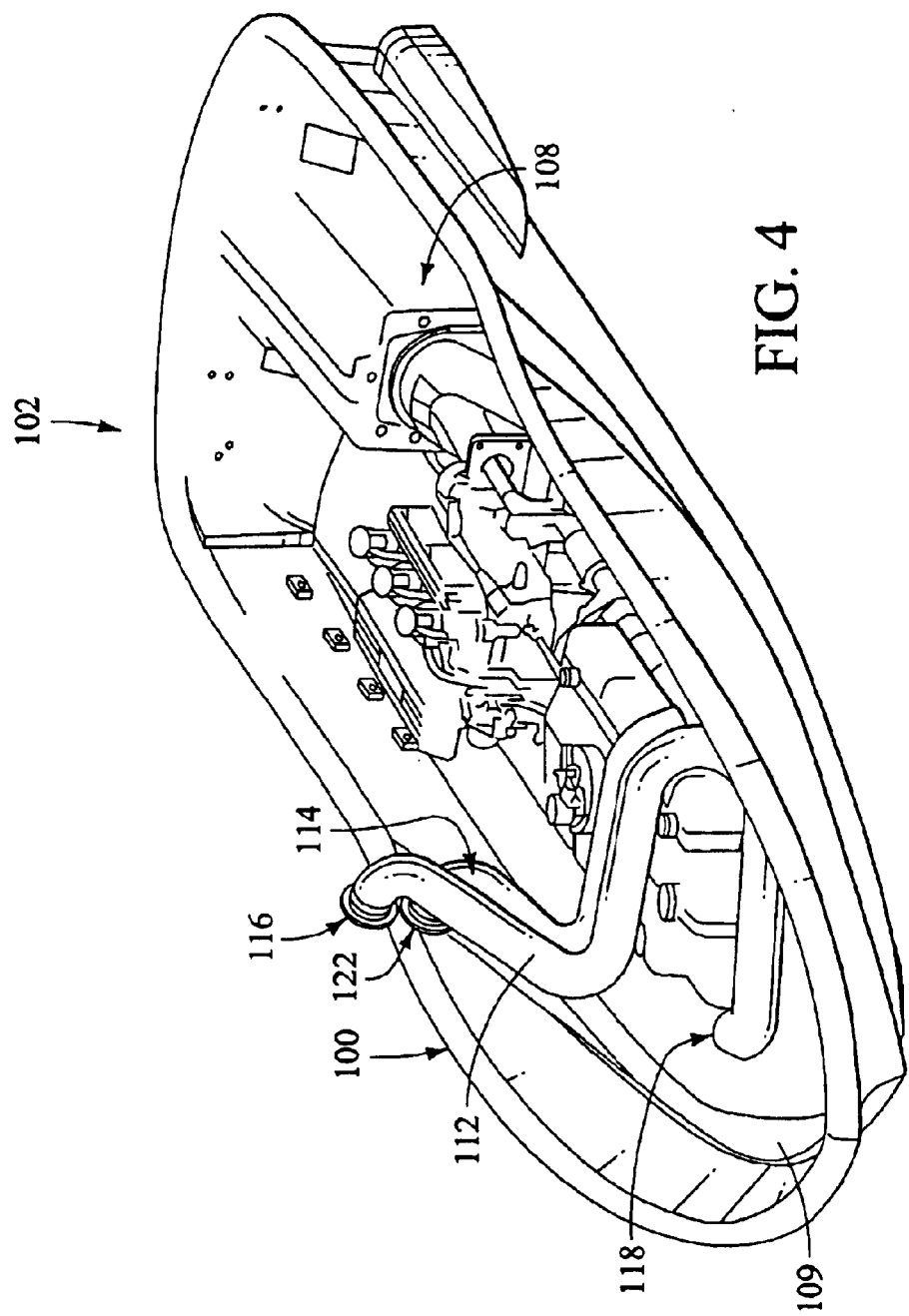
FIG. 4 is a perspective view of a ventilation system shown in the hull of a personal watercraft with the deck removed, according to another preferred embodiment of the invention.

FIG. 4 is a perspective view of a ventilation system shown in the hull of a personal watercraft with the deck removed according to another preferred embodiment of the invention.

In this preferred embodiment, the first pipe 112 extends around the front of the fuel tank 110 to the first side of the hull 106 where its outlet port 118 is located. The intake ports 116, 120 of the first and second pipes 112, 114 shown in FIGS. 3 and 4 are shown floating in air. When the air ventilation system is installed in the watercraft, the intake ports 116, 122 will be secured to the deck as shown in FIG. 5.

Figure 5:
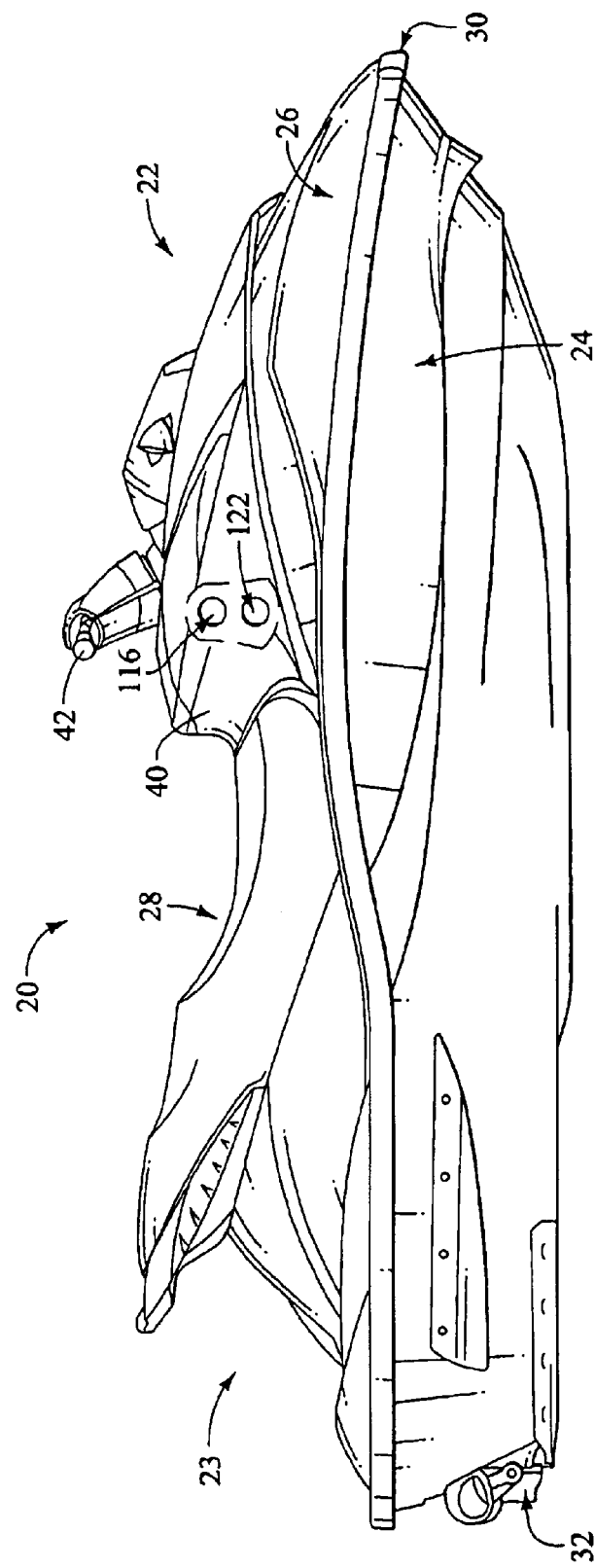
FIG. 5 is a cut-away, schematic view of the watercraft shown in FIG. 1 showing dual air inlets under a shroud according to a preferred embodiment of the invention.

FIG. 5 is a schematic view of a deck having dual air intake ports according to a preferred embodiment of the present invention. A portion of the shroud 40 has been cut away to show the intake ports 116, 122. In a preferred embodiment, the intake ports 116, 122 are located adjacent to one another. In another preferred embodiment one intake port may be located in a bow region and the other intake port may be located in a stem region.

The ventilation system according to another preferred embodiment may include a single pipe having the same configuration as the first pipe 112 shown in FIG. 3. In addition, if a first and second pipe are used, they may be formed as a single dual lumen structure which provides even greater ease of installation.

The operation of the ventilation system 100 will now be described. Ambient air enters the watercraft through duct work, is consumed by the internal combustion engine and is expelled through the exhaust system. As the watercraft is operating, the engine creates a negative air pressure within the watercraft hull. The hull therefore becomes ventilated as the engine compartment or hull interior is filled with fresh ambient air that is continuously being pulled through the ventilation pipes 112, 114 to offset the negative pressure in the hull interior. When the watercraft is not operating, the interior of the hull remains at atmospheric pressure and fresh air is allowed to circulate in the hull through the ventilation pipes 112, 114.

While a personal watercraft has been described as a preferred vehicle, it will be recognized that the ventilation system according to the preferred embodiments of the present invention may be used in other types of water vehicles with inboard motors such as jet boats for example, especially where the size and configuration of the engine compartment is a concern.

The above specification provides a complete description of the manufacture and use of the invention. Since many embodiments of the invention can be made without departing from the spirit and scope of the invention, the invention reside in the claims hereinafter appended.

What is claimed is:

1. A watercraft comprising:
a hull divided in half lengthwise by a centerline to create a first side and a second side;
a deck located on the hull, the deck divided in half lengthwise by the centerline;
a propulsion device carried by the hull for propelling the watercraft;
an engine positioned within the hull, the engine driving the propulsion device;
an air ventilation system for circulating air in the hull of the watercraft, the air ventilation system comprising:
a first pipe having an intake port and an outlet port, the intake port of the first pipe located on the first side of the watercraft; and
a second pipe having an intake port and an outlet port, the intake port of the second pipe located on the first side of the watercraft;
wherein the outlet port of the first pipe and the outlet port of the second pipe are located in a bottom region of the hull on the second side of the watercraft.

2. The watercraft according to claim 1 wherein the air inlet pipe and the second pipe extend substantially side-by-side through the watercraft.

3. The watercraft according claim 1 wherein the outlet port of the first pipe and the outlet port of the second pipe are located in the bottom third of the hull of the watercraft.

4. The watercraft according to claim 3 wherein the outlet port of the first pipe and the outlet port of the second pipe are located next to a fuel tank.

5. The watercraft according to claim 1 wherein the intake port of the first pipe and the intake port of the second pipe are located in the deck above the waterline of the watercraft.

6. The watercraft according to claim 5 wherein the deck has a shroud and the intake port of the first pipe and the intake port of the second pipe are located underneath the shroud.

7. The watercraft according to claim 5 wherein the intake port of the first pipe and, the intake port of the second pipe are located adjacent to one another.

8. The watercraft according to claim 5 wherein the intake port of the first pipe is located in a bow region of the deck and the intake port of the second pipe is located in a stern region of the deck.

9. The watercraft according to claim 1 wherein the hull further defines a rider's compartment having at least one seat and a control for the watercraft disposed forwardly of the seat.

10. An air ventilation system for circulating air in a hull of a watercraft, the system comprising:
a first pipe having an intake port and an outlet port, the intake port of the first pipe located on the first side of the watercraft; and
a second pipe having an intake port and an outlet port, the intake port of the second pipe located on the first side of the watercraft;
wherein the outlet port of the first pipe and the outlet port of the second pipe are located in a bottom region of the hull on the second side of the watercraft.

11. A system according to claim 10 wherein the small vehicle is a personal watercraft comprising:
a hull divided in half lengthwise by a centerline to create a first side and a second side;
a deck located on the hull, the deck divided in half lengthwise by the centerline;
a propulsion device carried by the hull for propelling the watercraft; and
an engine positioned within the hull, the engine driving the propulsion device.

12. The system according to claim 11 wherein the hull further defines a rider's compartment having at least one seat and a control for the watercraft disposed forwardly of the seat.

13. The system according to claim 11 wherein the first pipe and the second pipe extend substantially side-by-side through the watercraft.

14. The system according to claim 11 wherein the outlet port of the first pipe and the outlet port of the second pipe are located next to a fuel tank.

15. The system according to claim 11 wherein the outlet port of the first pipe and the outlet port of the second pipe are located in the bottom third of the hull of the watercraft.

16. The system according to claim 11 wherein the intake port of the first pipe and the intake port of the second pipe are located in the side of the deck above the waterline.

17. The system according to the claim 16 wherein the deck has a shroud and the intake port of the first pipe and the intake port of the second pipe are located underneath the shroud.

18. The watercraft according to claim 16 wherein the intake port of the first pipe and the intake port of the second pipe are located adjacent to one another.

19. The watercraft according to claim 16 wherein the intake port of the first pipe is located in a bow region of the deck and the intake port of the second pipe is located in a stern region of the deck.

20. A watercraft comprising:
a hull divided in half lengthwise by a centerline to create a first side and a second side;
a deck located on the hull, the deck divided in half lengthwise by the centerline;
a propulsion device carried by the hull for propelling the watercraft,
an engine positioned within the hull, the engine driving the propulsion device; and
an air ventilation system comprising means for circulating air in the hull of the watercraft, wherein the means for circulating air in the hull of the watercraft comprises:

a first pipe having an intake port and an outlet port, the intake port of the first pipe located on the first side of the watercraft; and a second pipe having an intake port and an outlet port, the intake port of the second pipe located on the first side of the watercraft;

wherein the outlet port of the first pipe and the outlet port of the second pipe are located in a bottom region of the hull on the second side of the watercraft.

21. An air ventilation system for circulating air in a hull of a watercraft, the system comprising:

a first pipe having an intake port and an outlet port, the intake port of the first pipe located on a first side of the watercraft;

a second pipe having an intake port and an outlet port, the intake port of the second pipe located on the first side of the watercraft;

wherein the outlet port of the first pipe is located on a second side of the watercraft and the outlet port of the second pipe is located on the first side of the watercraft.

22. The system according to claim 21, wherein the intake port of the first pipe and the intake port of the second pipe are located adjacent to one another.

23. The system according to claim 21 wherein the intake port of the first pipe is located in a bow region of the deck and the intake port of the second pipe is located in a stem region of the deck.

* * * * *